Aug. 25, 1942.   R. L. HINMAN   2,294,300
MILKING MACHINE
Filed June 9, 1939
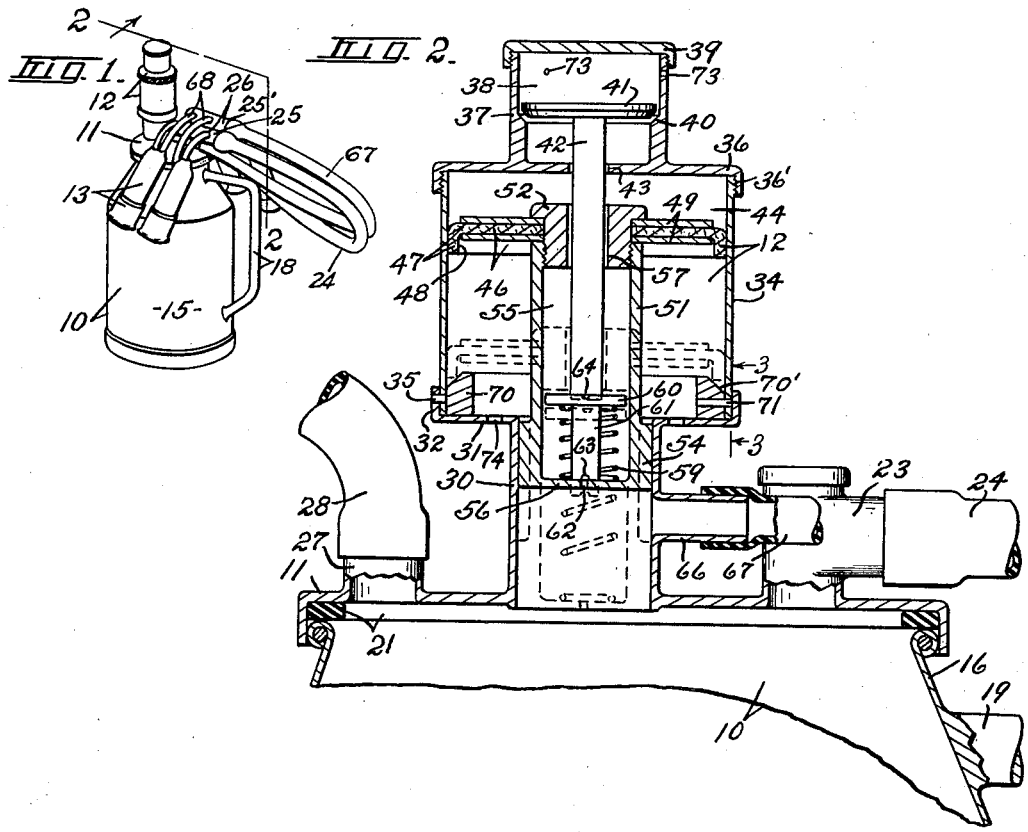
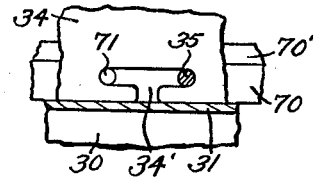
INVENTOR
RALPH L. HINMAN
BY
Theodore E. Simonton
ATTORNEY Patented Aug. 25, 1942

2,294,300

UNITED STATES PATENT OFFICE 2,294,300

MILKING MACHINE

Ralph L. Hinman, Oneida, N. Y.

Application June 9, 1939, Serial No. 278,200

5 Claims. (Cl. 31—62)

This invention relates to improvements in milking machines of the type which operate automatically to alternately cut off and apply vacuum or pressure to the teat cups.

One of the objects of the invention is to provide a milking machine with a durable simple and economically constructed timer mechanism which will successfully operate without attention throughout extended or prolonged periods for automatically causing an intermittent suction and releasing action in the teat cups.

Another object of the invention is to utilize the vacuum adapted to produce a suction action in the teat cups for actuating the timer mechanism.

In carrying out the above mentioned objects, I have produced a timer mechanism which is not only self-cleaning but will function without the application of lubricant, as grease, to delicately constructed members such as valves, ports, etc. which are readily contacted by dust and dirt usually contained in the atmosphere of a stable. This reduces the liability of the machine functioning improperly or failing to function altogether after having been in operation for a few hours and eliminates the frequent cleaning of such parts of the timer.

Another object of the invention is to provide a timer of the above mentioned class wherein the number of pulsations per minute are maintained substantially uniform from day to day without the aid of manually adjustable control members. This necessity of adjustment of the timer in order to maintain maximum efficiency in the operation of the milking machine has heretofore been a source of annoyance and inconvenience to operators of milking machines, to say nothing of the expense and time consumed in making such adjustments.

A still further object of the invention is to provide a timer having a piston provided with a yielding or pliant packing or valve member composed of leather or the like with means for maintaining said packing member in sealed relation with the wall of the piston chamber.

I attain these objects by mechanism illustrated in the accompanying drawing, in which:

Figure 1 is a perspective view of a milking machine embodying the various features of this invention.

Figure 2 is an enlarged detail vertical sectional view through the upper portion of a pail, a cover therefor and a timer mounted on said cover, taken substantially in the plane of the line 2—2, Figure 1.

Figure 3 is a fragmentary sectional view taken on line 3—3, Figure 2.

My invention, as illustrated in the drawing, comprises primarily a pail 10, a cover 11, an automatic timer 12 connected with the cover 11 for controlling the pressure pulsations in the milk tube and teat cups and a cluster of teat cups 13.

Pail

The pail 10, as shown, comprises a cylindrical body portion 15 and a conical neck portion 16 connected with the upper end of the body portion 15. The pail 10 is provided with a handle 18 which, in this instance, comprises a rod bent substantially U-shaped. The rod may be connected at its ends with the body portion 15 and neck portion 16 in any suitable manner as by electric welding.

Cover

The cover 11 is, as usual in milking machines of this character, removably mounted on the upper end of the pail 10 and is adapted to be maintained in air-tight connection with the pail by means of a resilient washer 21 removably secured in an annular recess provided in the lower face of the cover 11. The cover 11, as shown in Figure 2, is provided with the usual milk delivery nipple 23 secured to the cover in communication with the interior of the pail 10. A flexible tube 24, having one end mounted on the nipple 23, is connected at its other end to the manifold 25 of the usual claw member 26 which is connected in a suitable manner to the interior of the teat cup inflations. The cover 11 is also provided with a nipple 27 which is secured to the outer face of the cover 11 in spaced relation to the nipple 23 with the interior thereof extending through said cover. A flexible hose 28, having one end mounted on the nipple 27, is adapted to be connected at the other end with a convenient air exhausting device (not shown) for maintaining a partial vacuum in pail 10.

Timer

The timer 12 comprises a cylinder member 30 which has one end extending through an aperture provided in the cover 11 at the center thereof, said cylinder being permanently secured to the cover by electric welding or other suitable means. The greater portion of the cylinder 30 extends outwardly from the cover 11 and has the outer end thereof provided with an outwardly extending annular plate 31 having the outer edge portion thereof bent laterally to provide an annular flange 32 extending away from the cylinder 30 in substantially concentric relation therewith.

Mounted on the plate 31 is a second cylinder 34 of greater diameter than the cylinder 30. The cylinder 34 is removably secured to the plate 31 in substantially coaxial relation therewith by a pair of diametrically disposed pins 35 secured to the flange 32 and which extend inwardly through corresponding T-slots 34' provided in the cylinder 34 at the lower edge thereof. The outer end of the cylinder 34 has removably connected thereto a head 36, as by screw-threads 36'. The head 36 has a cylindrical housing 37 connected therewith to extend outwardly therefrom and which provides a valve or inlet chamber 38 arranged substantially coaxially with the interior of the cylinders 30 and 34. The outer end of the housing 37 is closed by a cap 39 having screw-threaded engagement with said housing.

The valve chamber 38 is provided with a valve seat 40 arranged intermediate the ends thereof. A valve 41, mounted in the outer end portion of the valve chamber 38, is adapted to move into and out of engagement with the seat 40. The valve 41 is provided with a stem 42 which extends inwardly from said valve through the inner end portion of the valve chamber 38, through an aperture 43 provided in the head 36 substantially centrally thereof and into the chamber 44 of cylinder 34.

Mounted in the cylinder chamber 44 is a piston 46 comprising a flexible disk valve or packing 47 having a laterally disposed marginal flange 48 adapted to have air-tight contact with the wall of the cylinder chamber 44. The valve 47 has the central portion thereof supported between a pair of rigid washers or plates 49. The piston 46 is removably secured to one end of a tubular sleeve or connecting rod 51 by means of a flanged screw 52 extending downwardly through central apertures provided in the plates 49 and valve 47 into screw-threaded engagement with the interior of the sleeve 51. The screw 52 also coacts with the sleeve 51 for securing the plates 49 and valve 47 to each other. The sleeve or connecting rod 51 extends downwardly from the piston 46 into the interior of cylinder 30 and is provided at its lower end with a piston 54 reciprocatively mounted in the cylinder 30.

The inner chamber 55 of the sleeve 51 has the lower end thereof closed by the end wall 56 of piston 54. The upper end of the sleeve 51 is substantially closed by the hereinbefore mentioned screw 52 which is provided with a central aperture 57 through which the valve stem 42 extends. Mounted in the chamber 55 is a spring 59 which contacts at its lower end with the wall 56 and has the upper end thereof in engagement with the head 60 of a trip pin 61 for yieldingly urging the pin toward the upper end of sleeve 51.

The wall 56 of the piston 54 is provided with a centrally disposed aperture 62 adapted to maintain the interior 55 of sleeve 51 in communication with the lower end portion of cylinder 30 and, therefore, with the interior of the pail 10. In order that the aperture 62 will not be closed when the trip pin 61 is in its lowermost position, the lower end of said trip pin is provided with diametrically disposed recesses or grooves 63. Likewise, the upper face of the head 60 may be provided with diametrically disposed recesses or grooves 64 so that if said head comes into contact with the lower end of the screw 52, the aperture 57 through said screw will not become sealed by said head.

The cylinder 30 is provided with a laterally disposed nipple 66 communicating with the interior of said cylinder substantially midway between the ends thereof. A flexible tube 67 is connected at one end to the nipple 66 and has the other end thereof connected to the manifold 25' of the claw 26 which, in turn, is connected by tubes 68 with the interior of the shells of the teat cups 13.

Mounted in the lower end of the cylinder 34 adjacent the end plate 31 is an expander ring 70 which is removably connected with the cylinder 34 by a pair of diametrically disposed pins 71 secured to said ring and which extend outwardly into the adjacent T-slots 34' provided in the lower end of the cylinder 34. The ring 70 has the upper outer marginal edge thereof tapered inwardly, as at 70' to form a cam surface adapted to be engaged by the lower edge of the flange 48 of the piston valve 47 for pressing said flange outwardly against the inner wall of the cylinder 34 when the piston 46 is in its lowermost position and thereby maintaining the valve 47 in air-tight sealed relation with the cylinder 34.

It will now be understood that when vacuum is maintained in the pail 10 by the connection of the tube 28 with a suitable air exhausting device, the end portion of the cylinder 30 beneath the piston 54 will also be maintained under vacuum. It also follows that inasmuch as the cylinder 30 is maintained in communication with the upper end portion of the cylinder 34 by the air passage provided by the aperture 57 in screw 52, chamber 55 of the sleeve 51 and the aperture 62, vacuum will also be normally maintained in the upper end of the cylinder 34. Likewise, the lower or inner end of the valve 41 will be maintained under the influence of vacuum due to the connection of the lower portion of the valve chamber 38 with the interior of the cylinder 34 by the aperture 43.

The outer end portion of the valve chamber 38 is maintained in permanent communication with the outside atmosphere by apertures 73 provided in the wall of the housing 37 beneath the cap 39. It therefore follows that the valve 41 will be maintained in engagement with the seat 40 by the different fluid pressures provided at opposite sides of the valve.

When the valve assembly consisting of the pistons 46 and 54 and the connecting means therefor is in its lowermost position, the line of communication between the nipple 66 and the interior of the pail 10 will be closed by the piston valve 54 due to said valve being located beneath the inlet of the nipple 66, as indicated by broken lines in Figure 2. The lower portion of the cylinder 34 is maintained in communication with the outside atmosphere by openings 74 provided in the end plate 31, so that when the piston valve 54 is in its lowermost position, atmospheric pressure is admitted from the interior of cylinder 34 through the upper portion of the cylinder 30 to the interior of the nipples 66 and thence to the interior of the teat cup shells through the tube 67 and tubes 68.

Assuming now that the piston assembly is in its lowermost position and that the valve 41 is in a closed position in engagement with the seat 40, air in the lower portion of the valve chamber 38 beneath the valve 41 and in the upper portion of the cylinder 34 above the piston 46 will be drawn downwardly through the interior of the tube 51 and aperture 62 into the pail 10, As the vacuum thus produced in the cylinder 34 approaches the value of the vacuum in the pail 10, the action of the vacuum upon the piston 46, due to the area of said piston being greater than that of piston 54, will overcome the action of the vacuum on said latter piston, thereby causing the valve assembly to move upwardly through the cylinders 30 and 34. The upward movement of the piston 54 will first close the opening of the nipple 66, after which said nipple will be brought into communication with the interior of the pail 10 as the opening to the nipple is uncovered by valve 54 and thereby bring the interior of the shells of teat cups connected with the nipple 66 under the influence of the vacuum in the pail 10.

During the initial upward movement of the piston assembly, the lower end of the valve stem 42 will be engaged by the trip pin 61 due to said trip pin being yieldingly maintained in its uppermost position by the spring 59. However, the valve 41 will not be moved from its closed position in engagement with the seat 40 by the trip pin and spring due to the action of the differential fluid pressure upon the valve 41 being greater than the action of the spring 59. As the piston assembly continues its upward or outward movement the trip pin 61 is engaged by the lower wall 56 of the chamber 55 and valve 41 will be positively moved from its seat 40 by the coaction of the wall 56, trip pin 61 and valve stem 42.

As soon as the valve 41 is moved out of engagement with the seat 40, air under atmospheric pressure passes through aperture 73 into the valve chamber 38 and then downwardly around the valve 41 through the aperture 43 into the upper end of cylinder 34. As the vacuum in the cylinder 34 is thus relieved, the valve assembly will be moved to its lowermost position by the action of the vacuum in the pail 10 upon the lower end of the piston valve 54.

The relative effective sizes of the apertures 43 and 62 are such that the vacuum in the cylinder 34 is gradually relieved so that the piston assembly is moved downwardly at substantially the same speed as that of the upward movement of said assembly and thereby maintain a substantially uniform operation of the milking machine. It is preferable that the size of the aperture 62 and the effective size of the aperture 43 are relatively small so as to maintain a high degree of efficiency in the operation of the machine. The sizes of apertures 43 and 62 not only maintain the amount of air drawn downwardly through the timing mechanism and out through the tube 28 at a minimum but also cause the air to move with such velocity through the aperture 43 around the valve stem 42 and through the aperture 62 as to maintain these elements practically free from dirt.

The aperture 43 is not only maintained clean and free from dirt by the passage of air therethrough but also by the excessive vertical movement of the valve stem 42 produced by the action of the spring 59 thereon after valve 41 is moved from its seat 40 by the piston assembly and trip pin 61, said action of the spring causing the valve 41 to move upwardly from the seat 40 into engagement with the cap 39. As the piston assembly moves downwardly, the valve 41 will be maintained in its uppermost position in contact with the cap 39 by the spring 59 until said spring is fully extended, whereupon the head 60 of the trip pin 61 is only slightly spaced from the inner end of screw 52.

As the valve assembly continues its downward movement after the spring 59 is extended, the valve 41 will move downwardly with said assembly until the valve again engages seat 40. As soon as the valve 41 is in its closed position, the upper end of cylinder 34 is cut off from communication with the outside atmosphere, with the result that air in the upper end of said cylinder is drawn downwardly through aperture 57, interior of the sleeve 51 and aperture 62, thus producing a partial vacuum at the upper end of the piston 46. As this vacuum at the upper end of the piston 46 increases in value, the action thereof upon the piston 46, together with the atmospheric pressure on the opoosite side of said piston overcomes the action of the vacuum in the lower end of cylinder 30 upon the piston 54 and causes the valve assembly to begin its upward movement.

It will now be noted that the differential fluid pressure upon the piston assembly caused by action of vacuum in pail 10 upon piston 54 and atmospheric pressure on valve 47, when valve 41 is open, not only produces the down stroke of the piston assembly but also causes flange 48 of piston valve 47 to engage the tapered or cam surface 70' of ring 70. This engagement of flange 48 with ring 70 is of sufficient force to press the flange outwardly against the wall of cylinder 34 so that at the beginning of each up stroke of the piston assembly the piston valve 47 is in sealed contact with cylinder 34.

These cycles of operation of the valve assembly may continue as long as vacuum is produced in the pail 10 to intermittently bring the teat cups 13 under the influence of the vacuum in the interior of the pail 10 and with the outside atmosphere through the medium of the timing mechanism.

Although I have illustrated and described in detail the preferred embodiment of my invention, I do not wish to be limited to the exact construction shown as various changes in the form and relation of the parts thereof may readily be made without departing from the spirit of the invention as set forth in the appended claims.

I claim:

1. In a timing mechanism for a milking machine or the like, a cylinder, a piston slidably mounted in said cylinder having a resilient sealing member engageable with the wall of the cylinder for maintaining fluid-tight connection between the piston and cylinder, and means within said cylinder and engageable with said sealing member at a predetermined position in the stroke of the piston for intermittently moving said sealing member into pressure engagement with the wall of the cylinder.

2. A structure as defined in claim 1 wherein the sealing member includes a marginal flange disposed substantially coaxially with the cylinder, and said means includes a ring having a tapered surface engaged by said flange for urging the latter into engagement with the cylinder wall.

3. In a milking machine, the combination with a receptacle having a vacuum chamber, of a pulsator comprising a casing connected with said receptacle and defining a pair of piston chambers of unequal diameters arranged in vertical relation one above the other, the smaller of said piston chambers being in direct communication with said vacuum chamber and having a part adapted to be connected with a set of teat cups, a reciprocating timer valve mechanism mounted in said casing including a pair of pistons, one piston for each chamber, the piston in said smaller piston chamber being adapted to control communication of the cups with said latter chamber for alternately bringing the cups into communication with the receptacle vacuum chamber and with the outside atmosphere, said pistons being connected to reciprocate in unison and having a restricted passage therethrough maintaining the upper end of the larger chamber in communication with the lower end of the smaller chamber, said casing having an air inlet passage connecting the upper end of the larger piston chamber with the outside atmosphere, a vertical reciprocating valve in said passage adapted to be maintained in the closed position by differential air pressure, and means including a spring actuated by the pistons at a predetermined position in the upward stroke of said pistons for opening said valve and maintaining the same in the open position during the greater portion of the downward stroke of said pistons.

4. In a milking machine, the combination with a receptacle having a vacuum chamber, of a pulsator comprising a casing connected with said receptacle and defining a pair of piston chambers of unequal diameters arranged in vertical relation one above the other, the smaller of said piston chambers being in direct communication with said vacuum chamber and having a part adapted to be connected with a set of teat cups, a reciprocating timer valve mechanism mounted in said casing including a pair of pistons, one piston for each chamber, the piston in said smaller piston chamber being adapted to control communication of the cups with said latter chamber for alternately bringing the cups in communication with the receptacle vacuum chamber and with the outside atmosphere, said pistons being connected to reciprocate in unison and having a bore extending inwardly from the upper end of the larger piston, said casing having an air inlet passage connecting the upper end of the larger piston chamber with the outside atmosphere, and a vertical reciprocating valve in said passage adapted to be maintained in the closed position by differential air pressure, said valve having a stem loosely received in said bore engageable with the lower end of the bore at a predetermined position in the upward stroke of said pistons for opening said valve against the action of said air pressure, said pistons being provided with a restricted passage maintaining the bore in communication with the lower end of the smaller piston chamber whereby the upper end of the larger piston chamber is maintained in constant communication with the vacuum in said lower end of said smaller chamber.

5. In a timing mechanism for a milking machine or the like, the combination with a vacuum chamber adapted to be connected with a source of suction; of a casing means defining a pair of piston chambers of unequal diameters arranged in vertical relation one above the other, the lower end of the smaller of said piston chambers being in direct communication with said vacuum chamber; said casing means having a member defining a passage extending laterally from said smaller piston chamber adapted to be operatively connected with a set of teat cups or the like; a reciprocating timer valve means mounted in said casing means including a pair of pistons, one piston for each piston chamber, said pistons being connected to reciprocate in unison and the piston in said smaller chamber being adapted to control communication of said lateral passage with said latter chamber for alternately bringing said passage in communication with the vacuum chamber and with the outside atmosphere; said casing means also having an air inlet passage connecting the upper end of the larger piston chamber with the outside atmosphere; and a vertical reciprocating valve member in said air inlet passage adapted to be maintained in the closed position by differential air pressure, said valve member and said timer valve means having mechanical elements coacting at a predetermined position in the upward stroke of said valve means for opening said valve member against the action of the said differential air pressure; one of said means having a fluid conveying means associated therewith defining a restricted valveless air passage maintaining the upper end of the larger piston chamber in constant communication with the vacuum in the lower end of said smaller piston chamber.

RALPH L. HINMAN.